United States Patent [19]

Santala et al.

[11] 3,953,176
[45] Apr. 27, 1976

[54] CATALYTIC CONVERTER

[75] Inventors: Teuvo J. Santala, Attleboro; Ernest M. Jost, Plainville, both of Mass.

[73] Assignee: Texas Instruments Incorporated, Dallas, Tex.

[22] Filed: May 22, 1973

[21] Appl. No.: 362,728

[52] U.S. Cl. ........................ 23/288 FC; 23/288 F; 165/179
[51] Int. Cl.² ........................................ F01N 3/15
[58] Field of Search .............. 23/288 F; 252/477 R; 165/179; 138/38

[56] References Cited
UNITED STATES PATENTS

| | | | |
|---|---|---|---|
| 2,374,609 | 4/1945 | McCollum | 165/179 UX |
| 2,664,340 | 12/1953 | Houdry | 23/288 F |
| 2,960,114 | 11/1960 | Hinde | 138/38 |
| 3,088,271 | 5/1963 | Smith | 23/288 F X |
| 3,109,715 | 11/1963 | Johnson et al. | 23/288 F |
| 3,169,836 | 2/1965 | Davis | 23/288 F |
| 3,180,712 | 4/1965 | Hamblin | 23/288 F |
| 3,186,806 | 6/1965 | Stiles | 23/288 F |
| 3,189,418 | 6/1965 | Gary | 23/288 FC |
| 3,295,919 | 1/1967 | Henderson et al. | 23/288 F |
| 3,503,714 | 3/1970 | Lang | 23/288 F |
| 3,527,565 | 9/1970 | Banchik et al. | 23/288 M X |
| 3,544,264 | 12/1970 | Hardison | 23/288 F X |
| 3,656,915 | 4/1972 | Tourtellotte | 23/288 F |
| 3,729,936 | 5/1975 | Palma et al. | 23/288 F X |
| 3,733,181 | 5/1973 | Tourtellotte et al. | 23/288 F |
| 3,755,204 | 8/1973 | Sergeys | 23/28 F UX |
| 3,798,006 | 3/1974 | Balluff | 23/288 FC |

*Primary Examiner*—Joseph Scovronek
*Assistant Examiner*—Arnold Turk
*Attorney, Agent, or Firm*—James P. McAndrews; John A. Haug; Russell E. Baumann

[57] ABSTRACT

A device for catalytically converting automotive exhaust gas pollutants to harmless substances comprises a plurality of catalyst units or sections of selected limited length which are disposed in alternate sequence with heat-dissipating means within a container so that the automotive exhaust gasses can be passed through the catalyst sections and heat-dissipating means in sequence. Each catalyst section is formed from a pair of corrugated strips of catalyst material which are wrapped together in a jelly-roll configuration. The paired catalyst strips have corrugations which are disposed obliquely relative to each other so that obliquely intersecting passage portions provided by the corrugations cooperate in forming passages of continuously varying cross-sectional area extending through each catalyst section.

8 Claims, 9 Drawing Figures

CATALYTIC CONVERTER

Where environmental pollutants are to be removed from automotive exhaust gasses in a proposed manner by passing the exhaust gasses over a catalyst so that the pollutants are catalytically converted to harmless substances, it is found that the disposition of the catalytic converter device in the automotive exhaust system can reduce automobile motor efficiency by interfering with the flow of exhaust gasses from the motor. It is also found that substantial quantities of relatively expensive catalyst material are required in the catalytic converter for assuring that substantially all of selected pollutants are removed from the exhaust gasses. In addition, because the catalyst materials tend to be subjected to very high temperatures while catalytically removing pollutants from the exhaust gasses, the catalyst materials tend to be embrittled during use and display a relatively short service life.

It is an object of this invention to provide a novel and improved device for catalytically converting automotive exhaust gas pollutants to harmless substances; to provide such a device which can be used while minimizing interference with the flow of exhaust gasses from an automobile motor; to provide such a device which utilizes a relatively small amount of catalyst material for removing substantially all of selected pollutants from the exhaust gasses; to provide such a device in which the catalyst material is characterized by a relatively long service life; and to provide such a device which is of compact and inexpensive construction.

Briefly described, the novel and improved catalytic converter device of this invention comprises a plurality of catalyst sections of selected limited length each of which has a multiplicity of passages of continuously varying cross-sectional area extending through the section. These catalyst sections are disposed in alternate sequence with heat-dissipating means in a container so that automotive gasses are adapted to be directed in sequence through the catalyst sections and heat-dissipating means. Each catalyst section is formed from a pair of corrugated strips of metal catalyst material which are wrapped together into a generally cylindrical, jelly-roll configuration. Each catalyst strip is corrugated on the bias and the two catalyst strips are brought together so that the corrugations of the paired metal strips are disposed obliquely relative to each other. In this arrangement, the catalyst strip corrugations are disposed in a herring-bone-like pattern and form a multiplicity of obliquely intersecting passage portions which cooperate in forming passages of relatively large and continuously varying cross-sectional area extending through each catalyst section. The relatively large passages permit exhaust gasses to flow through the catalyst sections with minimal interference with exhaust gas flow from an automobile motor. However, the continuously varying cross-sectional area of the passages prevents laminar flow of gasses through the passages and assures that, although a relatively small amount of catalyst material is used in the converter device, there is sufficient gas turbulence in the catalyst section passages so that all pollutants in the exhaust gasses are brought into contact with surfaces of the catalyst strip materials as the gasses pass through the converter device. Further, each of the catalyst strip corrugations in each catalyst section has intersecting line engagement with other corrugations in the section, these points of intersecting line engagement having a generally triangular distribution so that each portion of a corrugation has three-point engagement with adjacent corrugations providing a truss-like support for that portion of the corrugation. In addition, where the catalyst sections are subjected to very high temperatures during use, the catalyst strip corrugations tend to sinter together at these points of intersecting line engagement for strengthening the catalyst section structure with minimum reduction in the surface area of catalyst material exposed in each catalyst section passage. With regard to the sequential arrangement of catalyst sections and heat-dissipating means in the converter device, it has been noted that the catalyst materials in the converter are heated to some extent during use as a result of the relatively high temperatures of the exhaust gasses as they are directed into the converter device from an automobile motor. However, the catalyst materials then tend to be further heated as a result of exothermic catalytic reactions which take place in the converter as the exhaust gasses pass through the converter. Where the catalyst sections in the converter of this invention are of limited length, heat build-up in the catalyst sections due to these exothermic reactions is limited by the short lengths of the catalyst sections. The exhaust gasses leaving one catalyst section in the converter are then reduced in temperature as the gasses pass through the heat-dissipating means before the gasses are directed into a second catalyst section. In this way, the catalyst materials in the converter device are shielded from excessive temperature build-up and are found to resist embrittlement and fracture during use and are characterized by a relatively long service life.

Other objects, advantages and details of the catalytic converter device of this invention appear in the following detailed description of preferred embodiments of the invention, the detailed description referring to the drawings in which.

Figure 1:
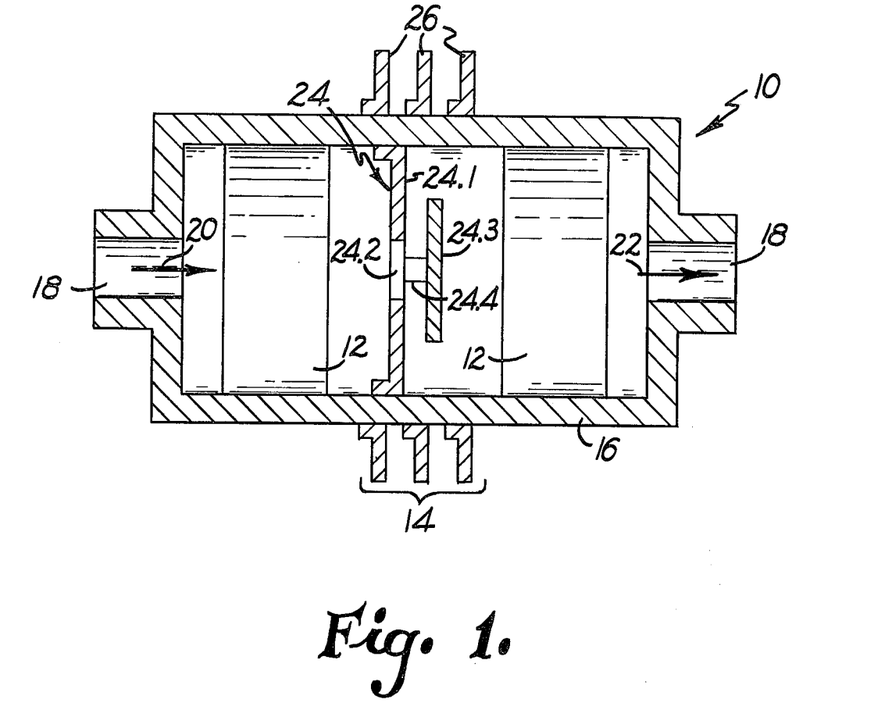
FIG. 1 is a section view along the longitudinal axis of the catalytic converter device of this invention.

Referring to the drawings, 10 in FIG. 1 indicates the novel and improved catalytic converter device of this invention which is shown to include a plurality of catalyst units or sections 12 which are disposed in alternate sequence with a heat-dissipating means 14 within a generally cylindrical, common container 16. Although the device 10 is shown to include two catalyst sections and one heat-dissipating means 14 for simplicity of illustration, it will be understood that additional catalyst sections and heat-dissipating means are used in the device 10 within the scope of this invention, three catalyst sections and two heat-dissipating means being arranged in alternate sequence with each other in a typical converter device provided by this invention. As illustrated, the device container 16 has inlet and outlet openings 18 and the device is adapted to be disposed in an automotive exhaust system so that exhaust gasses from an automobile motor are directed into the device 10 through an inlet opening 18 as indicated by the arrow 20 to pass through the catalyst sections 12 and through the heat-dissipating means 14 in sequence to exit from the converter device through an outlet opening 18 into the atmosphere, into another converter device, or into another part of the automotive exhaust system as indicated by the arrow 22 in FIG. 1.

In a preferred embodiment of the converter device 10, the heat-dissipating means 14 comprise baffle means 24 and fin means 26 or the like as shown in FIG. 1. Typically, for example, the baffle means 24 includes a first baffle plate 24.1 which is welded or otherwise secured to the container 16 and which has a central aperture 24.2. A second baffle plate 24.3 is secured to the first plate in alignment with the first plate aperture by means of straps 24.4 or the like. In this preferred embodiment of the invention, the container 16 is also formed of metal and the fin means 26 comprise a metal band which is welded or otherwise secured around the periphery of the container 16. In this arrangement, the exhaust gasses passed through the first catalyst section 12 shown at the left of FIG. 1 are passed over the baffle plates 24.1 and 24.3 and against the walls of the container 16 so that heat is transferred from the gasses to the plates and to the container wall. This heat is then dissipated from the converter device 10 through the container wall and through the fin means 26. As a result, the exhaust gasses entering the second catalyst section 12 shown at the right of FIG. 1 are at a relatively lower temperature than the temperature at which these gasses were passed out of the first catalyst section 12. The purpose for this reduction in temperature of the exhaust gasses is further discussed below. However, it will be understood that, altough the heat-dissipating means 14 are shown as comprising baffle and fin means, other heat-dissipating means could be incorporated in the converter device 10 within the scope of this invention. For example, the heat-dissipating means could comprise means for circulating coolant fluid or the like around or through the portion of the container 16 located between the two catalyst sections 12 or could comprise other conventional heat-sink or heat-dissipating means within the scope of this invention.

Figure 2:
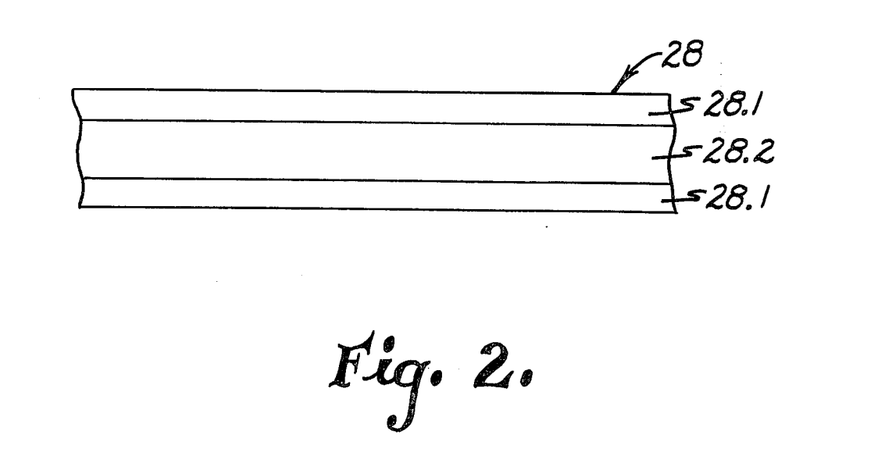
FIG. 2 is a partial side elevation view to enlarged scale of the catalyst strip material used in the device of FIG. 1.

In accordance with this invention, each of the catalyst sections 12 in the converter device 10 is preferably formed from strips of catalyst material having a thickness in the range from about 0.003 inches to 0.010 inches. Preferably, for example, this catalyst strip material comprises a composite metal laminate 28 as shown in FIG. 2 having very thin surface layers 28.1 of a metal catalyst metallurgically bonded or otherwise secured to one or both sides of a supporting layer 28.2 of a core metal which is characterized by high strength at elevated temperatures. Any desired metal catalyst material is used within the scope of this invention depending upon the nature of the catalytic reactions to be performed with the converter device 10 and upon the nature of the pollutants to be catalytically removed from the automotive exhaust gasses. Typically, where the converter device 10 is to be used in removing nitrogen oxide pollutants from automotive exhaust gasses, the core layer 28.2 of the composite catalyst strip material is formed of stainless steel or a nickel-chromium alloy or the like whereas the catalyst surface layers 28.1 of the composite are formed of a copper-nickel-vanadium alloy. In such a case, the composite metal strip material 28 has a total composite thickness in the range from about 0.003 to 0.006 inches with the outer catalyst layers of the composite having a thickness on the order of about 0.0005 to 0.001 inches. As such metal catalysts are known, the materials of the metal strip 28 are not further described herein and it will be understood that various catalysts, whether supported on high strength core materials or the like or whether unsupported by such core materials, are used in the strip material 28 within the scope of this invention.

Figure 3:
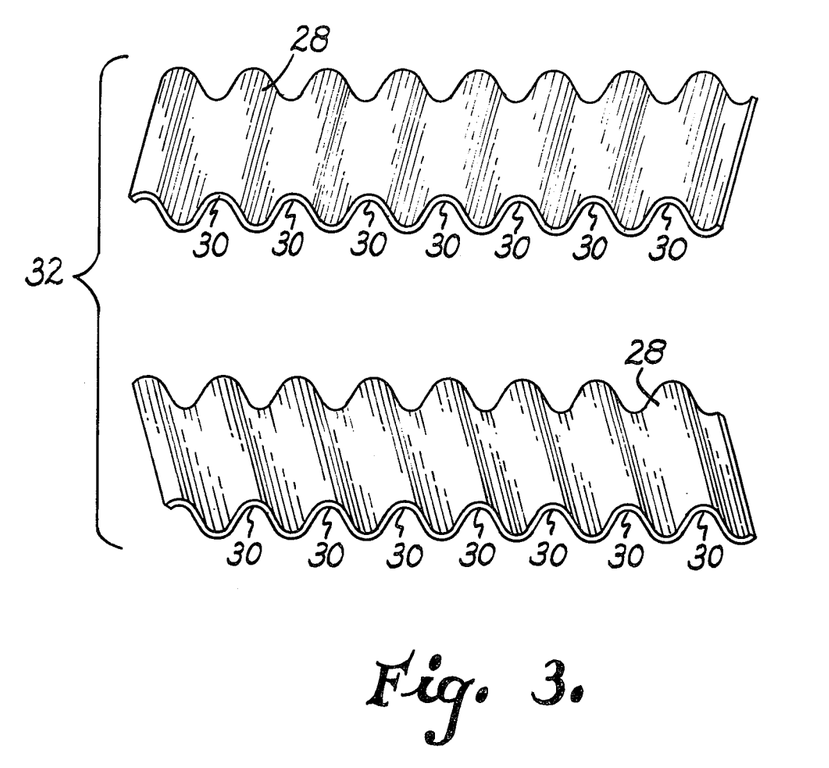
FIG. 3 is a partial, exploded, perspective view to enlarged scale of the catalyst material shown in FIG. 2 illustrating a step in the manufacture of the device of FIG. 1.
Figure 4:
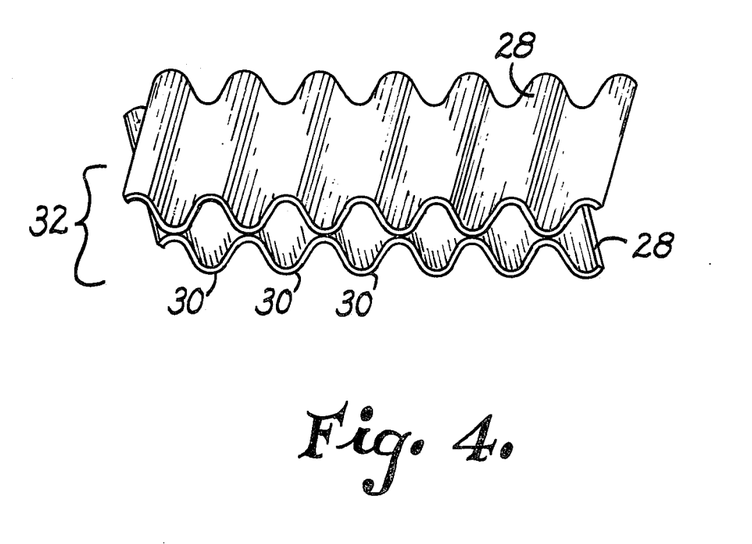
FIG. 4 is a partial perspective view similar to FIG. 3 but to somewhat smaller scale illustrating a subsequent step in the manufacture of the device of FIG. 1.
Figure 5:
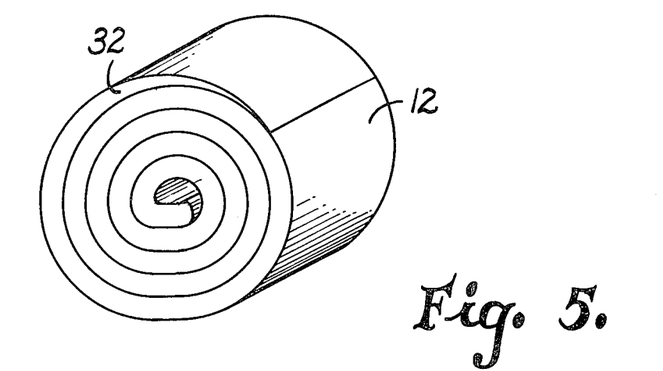
FIG. 5 is a perspective view to still smaller scale of a catalyst section used in the device of FIG. 1 and made from the material illustrated in FIG. 4.

In accordance with this invention, the metal catalyst strip material 28 is corrugated in any conventional manner as indicated at 30 in FIGS. 3 and 4. Preferably, as illustrated, the corrugations 30 of the strips 28 are formed on the bias to extend obliquely with respect to the longitudinal axis of the metal strip. In further accord with this invention, two of these corrugated strips 28 are paired together as indicated at 32 in FIGS. 3 and 4 so that the corrugations 30 of the paired strips are obliquely disposed relative to each other and form a herring-bone-like pattern. The paired strip materials 32 are then wrapped together in a jelly-roll configuration as shown in FIG. 5 to form a generally cylindrical catalyst section 12. The corrugations of the paired strip material 32 are omitted from FIG. 5 for purposes of clarity in FIG. 5 but the corrugations 30 of the individual strips 28 are shown in paired relation in FIG. 4 and are shown to enlarged scale in the enlarged partial view of FIG. 6. If desired, the convolutions of the catalyst section 12 are secured together in any conventional manner as by use of a strap secured around the cylindrical periphery of the catalyst section or by welding small portions of adjacent convolutions in the section to each other. Alternately, the catalyst section 12 is disposed in the container 16 to be retained in its cylindrical configuration by the walls of the container. In a preferred embodiment of the converter of this invention, the corrugations 30 in the strips 28 have an overall height on the order of 0.020 to 0.075 inches and the corrugations are spaced with a center-to-center spacing on the order of 0.050 to 0.150 inches. Preferably the corrugations are straight-sided with small radii at the apex of each corrugation so that each corrugation forms a portion of a passage through the catalyst section having the cross-sectional shape of an equilateral triangle. Preferably also, the widths of each of the metal catalyst strips 28 is in the range from about 1.0 to 2.5 inches. The corrugations 30 are also preferably disposed at an angle of from about 45° to 80° to the longitudinal axis of the strips 28 with a preferred arrangement having the corrugations 30 disposed at an angle of about 75° to the axis of the strips.

Figure 6:
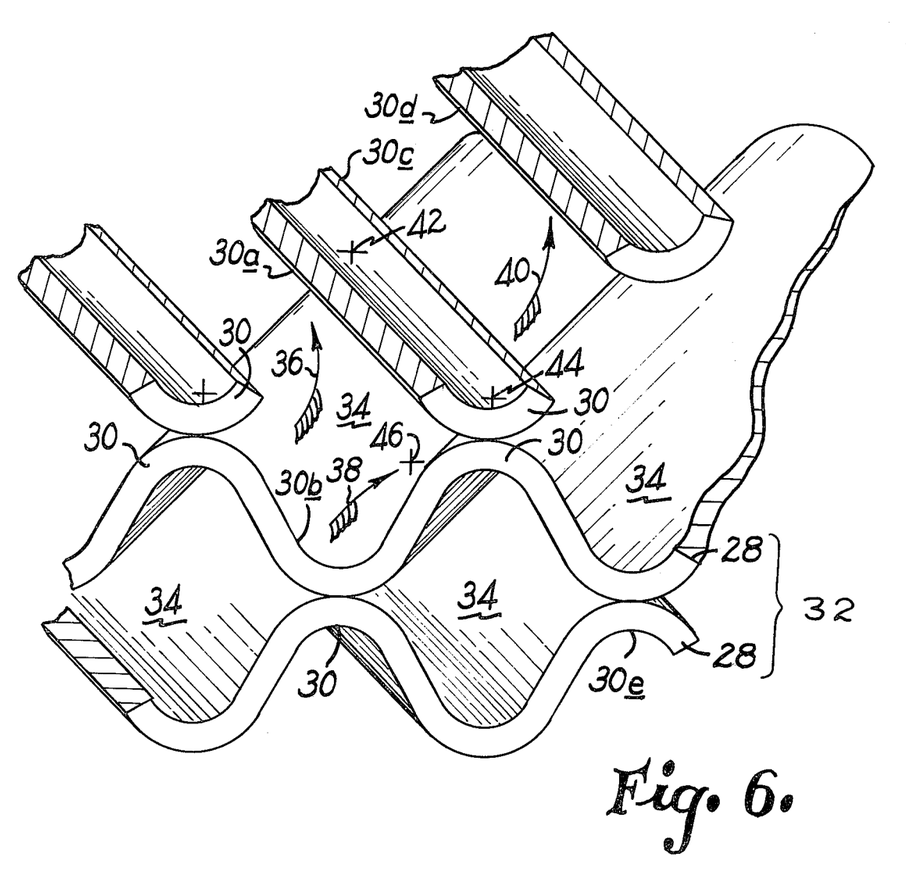
FIG. 6 is a partial perspective view to greatly enlarged scale of the catalyst section shown in FIG. 5 illustrating advantages of the catalytic converter device of FIG. 1.

In this arrangement of the catalyst strip materials 28 in the catalyst sections 12, the corrugations 30 of the paired strips 28 define obliquely intersecting passage portions. These passage portions cooperate as illustrated in FIG. 6 to form relatively large passages 34 which extend through the catalyst section 12. Each of the passages 34 is defined or surrounded by a selected metal catalyst material. Further, each of the passages 34 is of relatively large cross-sectional area to facilitate exhaust gas flow through the catalyst sections 12 without tending to cause excessive build-up in back-pressure in an automobile motor. However, in accordance with this invention, each of the passages 34 is of continuously varying cross-sectional area along the length of the passage. This continuous variation in cross-sectional passage area avoids the laminar flow of exhaust gasses through the catalyst sections by which some of the gasses might be able to pass through the catalyst sections without being contacted by any of the catalyst materials of the strips 28 which define the passages. Instead, the continuously varying cross-sectional area of the passages 34 assures that, in a relatively short length of the passage, substantially all of the gas molecules in the exhaust gasses will impinge upon catalyst surface areas of the strips 28. Thus, as is indicated by the arrow 36 in FIG. 6, some of the exhaust gasses entering a passage 34 are deflected across the corrugation surface indicated at 30a in FIG. 6. Other gasses indicated by the arrow 38 are deflected before impinging upon the corrugation surface 30a but are deflected against the corrugation surface indicated at 30b in FIG. 6. Further, other gasses indicated by the arrow 40, which might avoid contact with the corrugation surfaces 30a and 30b are moved by turbulence in the passage 34 against corrugation surfaces 30c or 30d. In this way, relatively short catalyst sections 12 provided with relatively large passages to permit rapid gas movement through the sections assure that substantially all gasses passed through the converter device 10 are catalytically reacted against catalyst surfaces of the materials embodied in the catalyst sections.

In the noted arrangement of the corrugated metal catalyst strips 28 in the catalyst sections 12, it is also found that each corrugation 30 in each strip 28 has intersecting line engagement with other corrugations in the catalyst section at a plurality of locations. These point contacts have a generally triangular distribution throughout the catalyst section so that each portion of each corrugation is provided with a truss-like support by other corrugations in the catalyst section. Thus, the corrugation indicated at 30b in FIG. 6 has intersecting line engagement with the corrugation 30a at points 42 and 44 as shown in FIG. 6 and also has similar intersecting line engagement at point 46 with the corrugation 30e shown beneath the corrugation 30b in FIG. 6. Most important, where the catalyst strip materials 28 in the catalyst sections 12 are heated to relatively high temperatures during use of the converter device 10, the corrugations 30 of the strips 28 tend to sinter together but only at these points 42, 44 and 46 of intersecting line engagement. Thus such heating significantly strengthens the structure of the catalyst sections 12 without significantly reducing the catalyst surface areas which are exposed to exhaust gasses passed through the catalyst sections.

Most important, it will be noted that the catalyst sections 12 in the converter device 10 have selected limited lengths and are spaced from each other by heat-dissipating means 14. In this regard, it is contemplated that the converter device 10 be used so that exhaust gasses passed through the converter are at elevated temperatures such as the temperatures at which the exhaust gasses are expelled from an automobile motor or the temperatures at which desired catalytic reactions take place with greatest efficiency. Typically, for example, the exhaust gasses are directed into the converter device at temperatures in excess of 900° F. However, because many of the catalytic reactions utilized in removing environmental pollutants from exhaust gasses are exothermic in nature, the exhaust gasses tend to increase significantly in temperature as the gasses pass through each catalyst section 12. Such increase in gas temperature could result in weakening of the structure of the catalyst section, or in degradation of the catalyst materials in the sections, or could result in significant lowering of efficiency of the desired catalytic reactions. In the device 10 of this invention, however, each of the catalyst sections 12 has a limited length in the range from about 1.0 to 2.5 inches, preferably about 2.0 inches, so that only limited increase in gas temperature occurs in a catalyst section as a result of such exothermic catalytic reactions as the gasses pass through the section. The hot exhaust gasses are then emitted from the catalyst section to impinge upon the heat-dissipating means 14 which are effective for reducing gas temperatures to desired levels before the gasses are again directed into a second catalyst section 12 for continuing the desired catalytic reactions. Of course, the heat-dissipating means are adapted to prevent over-cooling of the exhaust gasses such as would tend to retard the catalytic reactions in subsequent catalyst sections in the device 10. Typically, for example, the catalyst sections are spaced at a distance from 1.0 to 3.0 inches apart in the device 10 for permitting significant but controlled lowering of gas temperatures as the gasses pass between adjacent catalyst sections in the device 10. In this way the converter device 10 is adapted to operate at the most efficient temperatures for the desired catalytic reactions and for avoiding such over-heating of the catalyst materials in the converter device as would tend to excessively shorten the service life of the catalyst materials.

Figure 7:
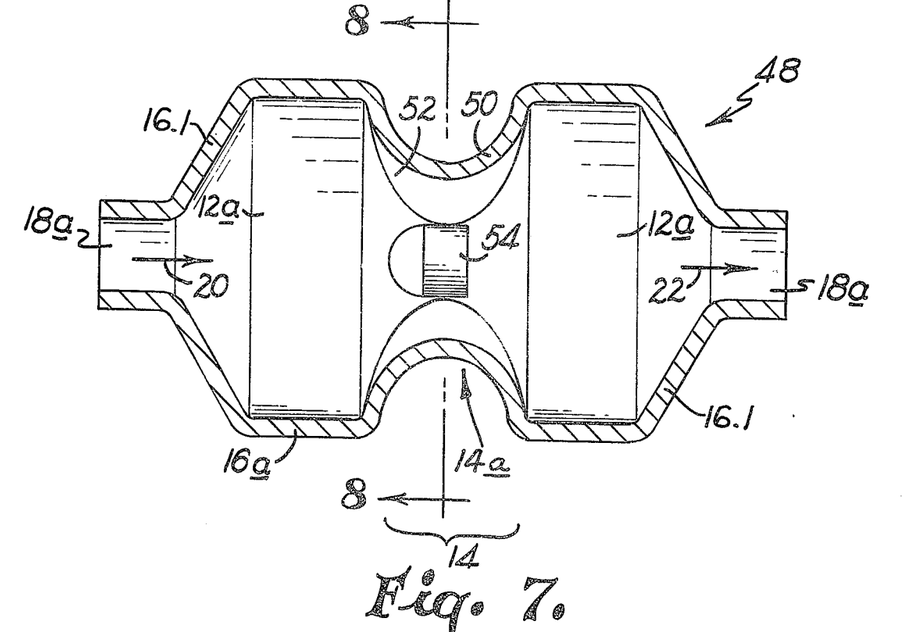
FIG. 7 is a section view similar to FIG. 1 illustrating an alternate embodiment of the catalytic converter of this invention.
Figure 8:
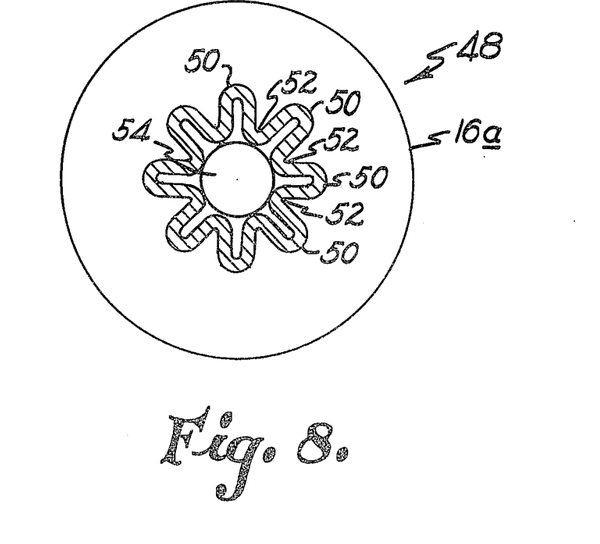
FIG. 8 is a section view along line 8—8 of FIG. 7.

A particularly economical embodiment of the catalytic converter of this invention is indicated at 48 in FIGS. 7 and 8, components of the device 48 corresponding to components of the converter 10 previously described being indicated in FIGS. 7 and 8 by corresponding reference numerals. In this economical device 48, a portion of the generally cylindrical container 16a is provided with a series of double-tapered pleats 50 and flutings 52 around the periphery of the container forming a reduced diameter portion of the container and having the flutings 52 engaging and holding a baffle plug 54 between the flutings. Two catalyst sections 12a formed of the paired, corrugated catalyst strip material 32 as previously described are then disposed within the container 16a to be properly spaced from each other by the reduced diameter portion of the container. The ends of the container 16a are then spun or otherwise shaped with the tapers 16.1 for positively locating the catalyst sections 12a in the container and for forming the inlet and outlet openings 18a of the container. In this economical arrangement, the pleats and flutings in the container and the baffle plug 54 form a heat-dissipating means 14a between the catalyst sections. That is, automotive exhaust gasses which are directed through the first catalyst section 12a shown at the left of FIG. 7 are directed through the pleats 50 by the baffle plug so that heat from the gasses is transferred to the pleated and fluted portion of the container wall, whereby the gasses are somewhat cooled for the purposes described above before the gasses are then directed through the second catalyst section 12a in the converter 48.

Figure 9:
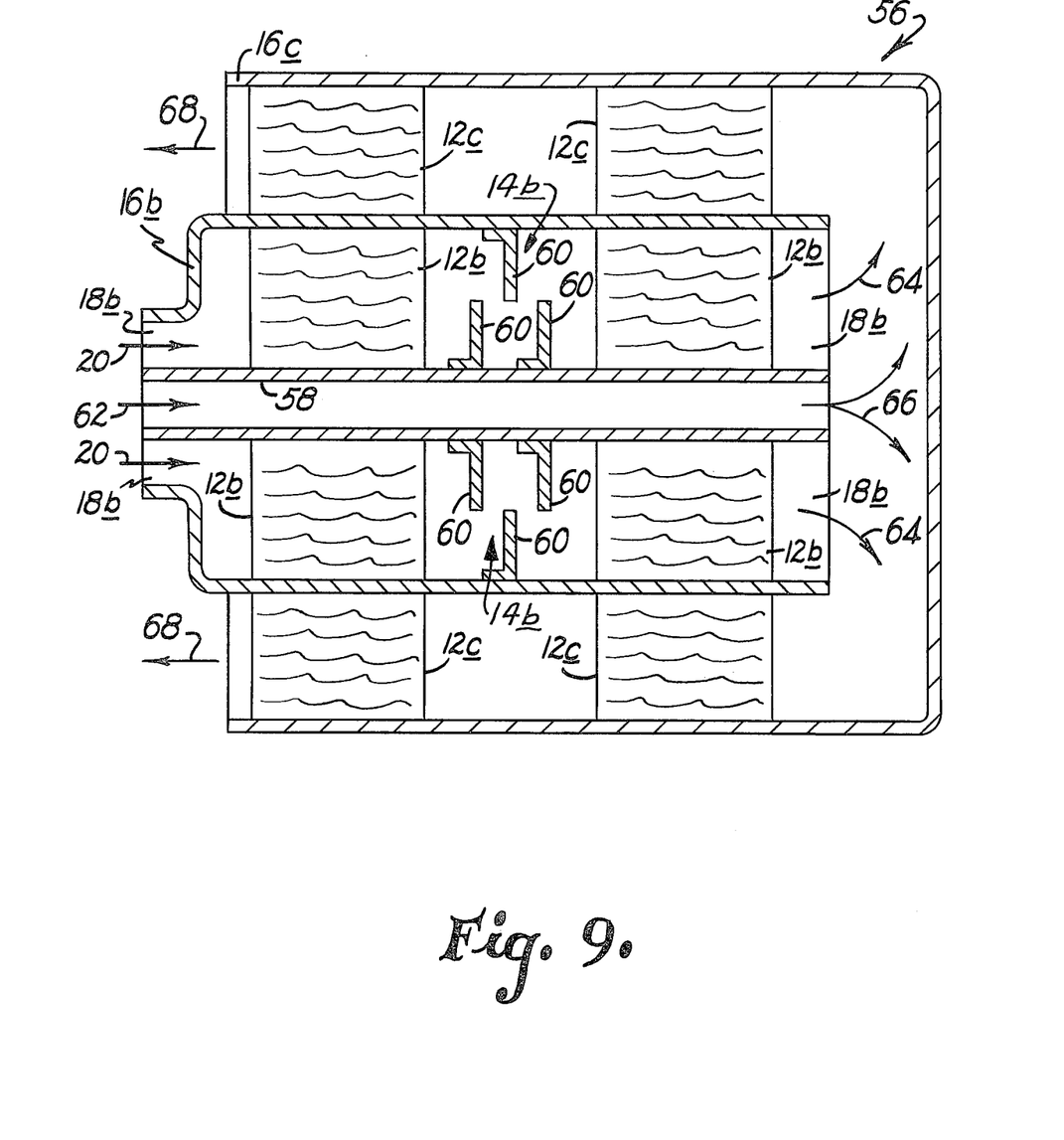
FIG. 9 is a section view similar to FIG. 1 illustrating another alternate embodiment of the converter of this invention.

Another alternate embodiment of the catalytic converter of this invention is indicated at 56 in FIG. 9, this embodiment of the converter being particularly adapted for use where a dual-bed catalytic converter is to be used. In this embodiment of the invention, catalyst sections 12b are formed with a hollow cylindrical configuration by wrapping the paired, corrugated catalyst strip material 32 previously described around a metal tubing 58. A container 16b is then disposed around the catalyst sections 12b to form the inlet and outlet openings 18b. Heat-dissipating means 14b are formed between the catalyst sections 12b as by welding metal baffle plates 60 to the tubing 58 and to the container 16b. Additional catalyst sections 12c are then formed by wrapping paired, corrugated catalyst strip material 32 around the container 16b and an additional container 16c is disposed around the catalyst sections 12c with the closed end of the container juxtaposed to the outlet of the container 16b and the tubing 58. As will be understood, different metal catalyst materials are embodied in the catalyst sections 12b and 12c. Typically, for example, the catalyst materials embodied in the catalyst sections 12b are selected to catalytically remove nitrogen oxides from automotive exhaust gasses whereas the catalyst sections 12c embody catalyst adapted to remove hydrocarbons and the like from the automotive exhaust gasses. In this arrangement of the converter device 56, automotive exhaust gasses are directed into the catalyst sections 12b as indicated by the arrows 20 while air is directed into the tubing 58 as indicated by the arrow 62. The automotive exhaust gasses are heated by exothermic catalytic reactions taking place in the first catalyst section 12b shown at the left of FIG. 9 as previously described. However, these gasses are then somewhat cooled as the gasses pass over the heat-dissipating means 14b so that the gasses are at the desired temperature level as they enter the second catalyst section 12b in the converter 56. In this regard, it will be appreciated that this heat is dissipated from these exhaust gasses through the tubing 58 into the air directed through the tubing for desirably heating this air as well as through the wall of the container 16b. As the gasses then exit from the second catalyst section 12a the gasses are directed in sequence through the additional catalyst section 12 c as indicated by the arrows 64 in FIG. 9. In addition, these gasses are mixed with the air directed through the tubing 58 as indicated by the arrow 66 in FIG. 9. As this air has been heated in passing through the tubing 58, mixing of the air with the automotive exhaust gasses does not excessively cool the exhaust gasses so that these gasses are at desirable temperature levels entering the catalyst sections 12c for most efficient catalytic removal of pollutants from the gasses as the gasses pass through the catalyst sections 12c. In the converter device 56 as shown in FIG. 9, the gasses passing between the two catalyst sections 12c tend to be additionally heated by heat transferred through the wall of container 16b for maintaining the temperature of the gasses if desired. Alternatively, additional heat-dissipating means (not shown) can be disposed within the container 16c between the catalyst sections 12c if reduction in gas temperature is desired as the gasses pass between the catalyst sections 12e. The gasses are then directed out of the catalytic converter 56 to the atmosphere or to another part of an automotive exhaust system as indicated by the arrows 68 in FIG. 9.

It should be understood that although particular embodiments of the catalytic converter device of this invention have been described by way of illustrating the invention, this invention includes all modifications and equivalents of the disclosed embodiments which fall within the scope of the appended claims.

We claim:

1. A device for catalytically converting automotive exhaust gas pollutants to harmless substances comprising a container having an inlet and an outlet at opposite ends of said container, a plurality of pairs of strips of metal catalyst material, each strip having a plurality of corrugations therein extending obliquely across the longitudinal axes of said strips, each pair of said corrugated strip materials being wrapped together in a jelly roll configuration to form a generally cylindrical catalyst unit, whereby said plurality of pairs of said strips form a plurality of said cylindrical catalyst units, said paired strip materials having the corrugations thereof obliquely disposed relative to each other so that said corrugations define obliquely intersecting passage portions which cooperate to define a multiplicity of passages of continuously varying cross-sectional area extending from end to end through each of said cylindrical catalyst units, said plurality of catalyst units being disposed in spaced sequential relation to each other within said container with the cylindrical axes of the cylindrical catalyst units extending in the direction between the inlet and outlet of said container for permitting automotive exhaust gasses to pass through said catalyst units in sequence to catalytically convert pollutants in the gasses to harmless substances, said catalyst units each having a selected cylinder length for limiting heat buildup in said gasses passing through said catalyst unit as a result of exothermic catalytic reactions in said gasses, and heat dissipating means disposed within said container between said catalyst units for reducing the temperature of said gasses passing between said catalyst units.

2. A device as set forth in claim 1 wherein the corrugations of said strips of metal catalyst material are disposed at angles in the range from 45° to 75° relative to the longitudinal axes of said strips.

3. A device as set forth in claim 1 wherein said metal catalyst strip material embodies a catalyst material comprising a copper-nickel-vanadium alloy.

4. A device as set forth in claim 3 wherein said metal catalyst strip material comprises a composite metal laminate material having a core layer of a metal selected from stainless steels and nickel-chromium alloys and having at lease one surface layer of a catalyst material comprising a copper-nickel-vanadium alloy metallurgically bonded to said core layer.

5. A device as set forth in claim 3 wherein said metal catalyst strip material has a thickness in the range from about 0.003 to about 0.006 inches and a width from about 1.0 to 2.5 inches, said strip material having corrugations of a height from about 0.050 to 0.060 inches spaced at a center-to-center distance from about 0.050 to 0.100 inches.

6. A device for catalytically converting automotive exhaust gas pollutants to harmless substances comprising a metal container of generally cylindrical configuration having tapered end portions forming inlet and outlet openings for said container, each of said tapered container end portions forming one of said openings and defining one end of respective cylindrical chambers within said container, said container having a reduced diameter central portion having a plurality of alternate pleats and flutings therein around the periphery of said central portion, said central portion of said container defining an opposite end of each of said chambers within said container, a pair of catalyst units of generally cylindrical shape each having a multiplicity of passages extending therethrough, said catalyst units being disposed in said respective chambers so that each unit is held between said central container portion and one of said tapered container end portions to be in sequential relation to each other within said container between said inlet and outlet for permitting automotive exhaust gasses to pass through said catalyst units in sequence to catalytically convert pollutants in the gasses to harmless substances, said catalyst units each having a selected length for limiting heat build-up in said gasses passing through said unit as a result of exothermic catalytic reactions in said gasses, and a baffle plug held between said flutings for cooperating with said pleats and flutings in forming a heat-dissipating portion of said container between said catalyst units for reducing the temperature of said gasses passing between said catalyst units.

7. A device for catalytically converting automotive exhaust gas pollutants to harmless substances comprising a first container having an inlet and an outlet, a tubing disposed within said container and having a tubing inlet and outlet, said tubing extending between said inlet and outlet of said first container for directing air through said first container, a plurality of first catalyst units each having a multiplicity of passages extending therethrough, said first catalyst units being disposed in surrounding relation to said tubing extending between said tubing and said first container, said first catalyst units each comprising a pair of corrugated strips of metal catalyst material wrapped together in a jelly-roll configuration around said tubing to form a generally hollow cylindrical catalyst unit configuration, said paired strip materials having corrugations thereof obliquely disposed relative to each other so that said corrugations define obliquely intersecting passage portions which cooperate to define said multiplicity of passages with continuously varying cross sectional area extending through said catalyst units, said first catalyst units being disposed in spaced sequential relation to each other along said first container between said inlet and outlet for permitting automotive exhaust gasses to pass through said first catalyst units in sequence to catalytically convert pollutants in the gasses to harmless substances while air is directed through said tubing, said first catalyst units each having a selected length for limiting heat build-up in said gasses passing through said unit as a result of exothermic catalytic reactions in said gasses, heat-dissipating means secured between said tubing and first container at a location between said plurality of first catalyst units for dissipating heat from said gasses passing between said plurality of first catalyst units outwardly through said container and tubing, an additional generally cylindrical metal container having a closed end, said additional container being disposed around said first container and having said closed end juxtaposed to said outlet of said first container and tubing, and at least one additional catalyst unit having a multiplicity of passages extending therethrough, said additional catalyst unit being disposed around said first container extending between said first and additional containers so that gasses and air passed through said first container and said tubing are mixed and directed through said additional catalyst unit.

8. A device as set forth in claim 7 wherein said additional catalyst units embody catalyst materials which differ from the catalyst materials embodied in said first catalyst units.

* * * * *